US010218130B1

(12) United States Patent
Jung

(10) Patent No.: US 10,218,130 B1
(45) Date of Patent: Feb. 26, 2019

(54) HIGH VOLTAGE CONNECTOR

(71) Applicants: HYUNDAI MOTOR COMPANY, Seoul (KR); KIA MOTORS CORPORATION, Seoul (KR)

(72) Inventor: Yun Jae Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/824,809

(22) Filed: Nov. 28, 2017

(30) Foreign Application Priority Data

Aug. 22, 2017 (KR) .................. 10-2017-0105807

(51) Int. Cl.
| H01R 13/688 | (2011.01) |
| H01R 13/52 | (2006.01) |
| H01H 85/20 | (2006.01) |
| H01M 2/30 | (2006.01) |
| H01R 13/53 | (2006.01) |
| H01R 43/20 | (2006.01) |

(52) U.S. Cl.
CPC .......... *H01R 13/688* (2013.01); *H01H 85/20* (2013.01); *H01M 2/305* (2013.01); *H01R 13/5219* (2013.01); *H01R 13/53* (2013.01); *H01R 43/20* (2013.01); *H01M 2200/103* (2013.01)

(58) Field of Classification Search
CPC ... H01R 13/688; H01R 13/53; H01R 13/5219
USPC .................................................... 439/620.26
See application file for complete search history.

(56) References Cited

U.S. PATENT DOCUMENTS

| 3,728,787 | A | * | 4/1973 | McDonough | ........ H01R 9/0518 29/877 |
| 5,438,310 | A | * | 8/1995 | Ikari | ...................... H01H 85/20 337/186 |
| 5,739,739 | A | * | 4/1998 | Muramatsu | ........ H01H 85/0417 337/186 |
| 6,101,079 | A | * | 8/2000 | Viklund | ................... H01C 7/12 361/104 |
| 6,817,907 | B2 | * | 11/2004 | Cheng | ................. H01R 25/006 439/620.26 |

(Continued)

FOREIGN PATENT DOCUMENTS

JP          2002334648 A    11/2002
KR    20-1998-0050393 U    10/1998

(Continued)

*Primary Examiner* — Alexander Gilman

(74) *Attorney, Agent, or Firm* — Brinks Gilson & Lione

(57) ABSTRACT

The present disclosure provides a high voltage connector capable of detachably and stably fastening a fuse without using a separate component. A high voltage connector includes a first housing having an open rear portion, a fuse provided inside the first housing, a bus bar clip provided inside the first housing including a first wire connecting hole connected to a first wire, and a first fixing clip configured to detachably fasten the fuse, a bus bar clip terminal provided inside the first housing including a second fixing clip configured to form a clip shape and to detachably fasten the fuse, and a first terminal connected to a power source, and a male terminal provided inside the first housing including a second wire connecting hole connected to a second wire, and a second terminal connected to the power source.

16 Claims, 16 Drawing Sheets

(56) References Cited

U.S. PATENT DOCUMENTS

| | | | | |
|---|---|---|---|---|
| 7,748,117 | B2* | 7/2010 | Pizzi | H01H 69/02 |
| | | | | 264/272.15 |
| 8,425,256 | B2 | 4/2013 | Aoki et al. | |
| 9,124,021 | B2* | 9/2015 | Kashiwada | H01R 13/512 |
| 9,293,289 | B2* | 3/2016 | Chen | H01H 85/2045 |
| 2002/0068480 | A1* | 6/2002 | Pfaff | H01R 13/6273 |
| | | | | 439/108 |
| 2008/0242150 | A1* | 10/2008 | Chikamatsu | H01H 85/0208 |
| | | | | 439/620.3 |
| 2009/0137153 | A1* | 5/2009 | Yoshioka | H01R 4/185 |
| | | | | 439/607.24 |
| 2012/0094537 | A1* | 4/2012 | Aoki | H01R 13/688 |
| | | | | 439/620.26 |
| 2014/0087600 | A1* | 3/2014 | Von Zur Muehlen | |
| | | | | H01H 85/48 |
| | | | | 439/830 |
| 2014/0120767 | A1* | 5/2014 | Itsuki | H01R 13/5208 |
| | | | | 439/587 |
| 2014/0148045 | A1* | 5/2014 | Kashiwada | H01R 13/6592 |
| | | | | 439/485 |
| 2016/0104974 | A1* | 4/2016 | Yamaguchi | H01H 85/202 |
| | | | | 439/607.01 |
| 2016/0233625 | A1* | 8/2016 | Kato | H01R 13/688 |

FOREIGN PATENT DOCUMENTS

| | | |
|---|---|---|
| KR | 20-2010-0004079 U | 4/2010 |
| KR | 10-2011-0137822 A | 12/2011 |
| KR | 10-2012-0061822 A | 6/2012 |
| KR | 10-2013-0094831 A | 8/2013 |
| KR | 10-2016-0122603 A | 10/2016 |

* cited by examiner

_US 10,218,130 B1_

HIGH VOLTAGE CONNECTOR

CROSS-REFERENCE TO RELATED APPLICATION

The present application claims priority to and the benefit of Korean Patent Application No. 10-2017-0105807, filed on Aug. 22, 2017, which is incorporated herein by reference in its entirety.

FIELD

The present disclosure relates to a high voltage connector capable of stably fastening a fuse without using a separate component.

BACKGROUND

The statements in this section merely provide background information related to the present disclosure and may not constitute prior art.

Recently, a hybrid vehicle which adopts a motor driving source as an auxiliary power source has been introduced. This hybrid vehicle may reduce exhaust emissions as well as improve fuel efficiency.

The hybrid vehicle can travel in an Electric Vehicle (EV) driving mode which uses only the power of a motor by transferring the power of the motor to a transmission. The hybrid vehicle can also operate with a hybrid driving mode which uses the driving power of an engine as an auxiliary power source. Accordingly, the hybrid vehicle may contribute to improving fuel efficiency and reducing exhaust emissions.

The hybrid vehicle may include a motor, a Main Control Unit (MCU) for controlling the motor, a high voltage battery to supply power to the motor, etc., and use a high voltage connector as means for electrically connecting the individual components.

In an inside of the high voltage connector, a fuse is fastened, and the fuse is assembled in a separate component and then coupled to the inside of the high voltage connector together with the separate component.

In order to replace the fuse which is assembled in the separate component and then coupled to the inside of the high voltage connector, the separate component is disassembled from the high voltage connector, and then a matching terminal connected to the fuse is released, which may make replacement work difficult.

The fuse may be fastened to the terminal by soldering in order to stably fasten the fuse inside of the high voltage connector. However, in this case, when the fuse is damaged, both the fuse and the terminal should be replaced.

SUMMARY

Therefore, it is an aspect of the present disclosure to provide a high voltage connector capable of detachably and stably fastening a fuse without using a separate component.

Additional aspects of the disclosure will be set forth in part in the description which follows and, in part, will be obvious from the description, or may be learned by practice of the disclosure.

In one aspect of the present disclosure, a high voltage connector includes a first housing having an open rear portion, a fuse provided inside the first housing, a bus bar clip provided inside the first housing, and including a first wire connecting hole connected to a first wire, and a first fixing clip configured to detachably fasten the fuse, a bus bar clip terminal provided inside the first housing, and including a second fixing clip configured to form a clip shape and to detachably fasten the fuse, and a first terminal connected to a power source, and a male terminal provided inside the first housing, and including a second wire connecting hole connected to a second wire, and a second terminal connected to the power source.

The high voltage connector may include a first cover configured to cover the open rear portion of the first housing, a second housing coupled with the rear portion of the first housing configured to form an outer appearance and to block electromagnetic waves generated from an inside of the first housing, and a second cover coupled with a front portion of the second housing configured to form an outer appearance and to block electromagnetic waves generated from the inside of the first housing.

A first sealing member may be coupled with a front portion of the first cover to seal the inside of the first housing.

The first housing may include a pair of insertion portions configured to insert the first wire and the second wire into the insertion portion, a first nut press-fit portion configured to press a first nut such that the first nut fastens the bus bar clip, a second nut press-fit portion configured to press a second nut such that the second nut fastens the male terminal, a fixing portion configured to insert the bus bar clip terminal into the fixing portion, and a guide portion connected to the power source, wherein the first terminal and the second terminal pass through the guide portion.

The bus bar clip may be provided inside the first housing such that the first wire connecting hole is provided at a location corresponding to the first nut press-fit portion, and the bus bar clip may be fastened to inside the first housing together with the first wire by a bolt that is coupled with the first nut through the first wire connecting hole.

The male terminal may be provided inside the first housing such that the second wire connecting hole is provided at a location corresponding to the second nut press-fit portion, and the male terminal may be fastened to inside the first housing together with the second wire by a bolt that is coupled with the second nut through the second wire connecting hole.

The first fixing clip and the second fixing clip may be configured to form a ring shape having an open portion and to insert the fuse into the first fixing clip and the second fixing clip.

The first fixing clip may include a first fixing groove provided at both ends of the first fixing clip, and the second fixing clip may include a second fixing groove provided at both ends of the second fixing clip.

The first cover may include a first fixing rib and a second fixing rib configured to support the first fixing groove and the second fixing groove, and to prevent the fuse from being separated through the open portion, wherein the fuse is fastened to the first fixing clip and the second fixing clip.

The first cover may include a pair of first fixing ribs configured to press the first fixing clip at both ends of the first fixing clip and to fasten the fuse, and a pair of second fixing ribs configured to press the second fixing clip at both ends of the second fixing clip and to fasten the fuse.

The first cover further may include a first accommodating space configured to accommodate the fuse inside the first housing, a second accommodating space configured to accommodate one end of the first wire, and a third accommodating space configured to accommodate one end of the second wire.

The second housing and the second cover may be made of an electro-conductive material and be configured to block electromagnetic waves generated from the inside of the first housing.

The second housing and the second cover may include a pair of shielding portions configured to cover outer surfaces of the pair of the insertion portions.

The pair of the shielding portions may include a plurality of beads protruding toward the first wire and the second wire from the inner surfaces of the shielding portions, wherein the plurality of the beads are configured to shield the first wire and the second wire to block electromagnetic waves generated from the inside of the first housing.

The second cover may include a coupling hook inserted in and coupling with the second housing, and a first coupling hole coupled with the second housing by a bolt, and the second housing may include a coupling portion which the coupling hook is inserted in and coupled with, and a second coupling hole formed at a location corresponding to the first coupling hole.

The second cover may be coupled with the second housing by a bolt inserted in the first coupling hole and the second coupling hole, and the bolt is inserted into the second coupling hole through the first coupling hole that is located in a direction in which the first terminal and the second terminal are connected to the power source.

In one aspect of the present disclosure, a high voltage connector includes a first housing having an open rear portion, a fuse provided inside the first housing, a bus bar clip provided inside the first housing, and including a first fixing clip configured to detachably fasten the fuse, and a first fixing groove formed at both ends of the first fixing clip, a bus bar clip terminal provided inside the first housing, and including a second fixing clip configured to detachably fasten the fuse, and a second fixing groove formed at both ends of the second fixing clip, and a first cover configured to cover the open rear portion of the first housing, and including a first fixing rib and a second fixing rib configured to support the first fixing groove and the second fixing groove respectively to fasten the fuse that is fastened to the first fixing clip and the second fixing clip.

In another aspect of the present disclosure, a high voltage connector includes a first housing including an insertion portion into which a first wire and a second wire are inserted, a fuse provided inside the first housing, a bus bar clip provided inside the first housing, and including a first wire connecting hole connected to the first wire, and a first fixing clip to detachably fasten the fuse, a bus bar clip terminal provided inside the first housing, and including a second fixing clip to detachably fasten the fuse, and a first terminal connected to a power source, a male terminal provided inside the first housing, and including a second wire connecting hole connected to the second wire, and a second terminal connected to the power source, and a shield wire configured to cover the first wire and the second wire, and to shield the first wire and the second wire.

The high voltage connector may include a holder configured to fasten the first wire and the second wire, wherein the holder may be coupled with an end of the insertion portion.

A shield cover configured to fasten the shielding wire may be coupled with an outer surface of the insertion portion, and the shielding wire is fastened to the shield cover by a clamp to cover the first wire and the second wire.

The high voltage connector may include a first cover configured to cover an open rear portion of the first housing, a second housing coupled with the rear portion of the first housing to form an outer appearance and configured to block electromagnetic waves generated from the inside of the first housing, and a second cover coupled with a front portion of the second housing to form an outer appearance and configured to block electromagnetic waves generated from the inside of the first housing.

The second cover may include a coupling hook coupled with the second housing, and a first coupling hole coupled with the second housing by a bolt, and the second housing may include a coupling portion which the coupling hook is coupled with, and a second coupling hole formed at a location corresponding to the first coupling hole.

The shield cover and the insertion portion may include a first through hole and a second through hole that are respectively formed at locations corresponding to the first coupling hole and the second coupling hole.

The second cover may be coupled with the second housing by a bolt inserted in the first coupling hole and the second coupling hole, the bolt is inserted into the first coupling hole that is located in a direction in which the first terminal and the second terminal are connected to the power source, and the bolt inserted into the first coupling hole is coupled with the second coupling hole by passing through the first through hole and the second through.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
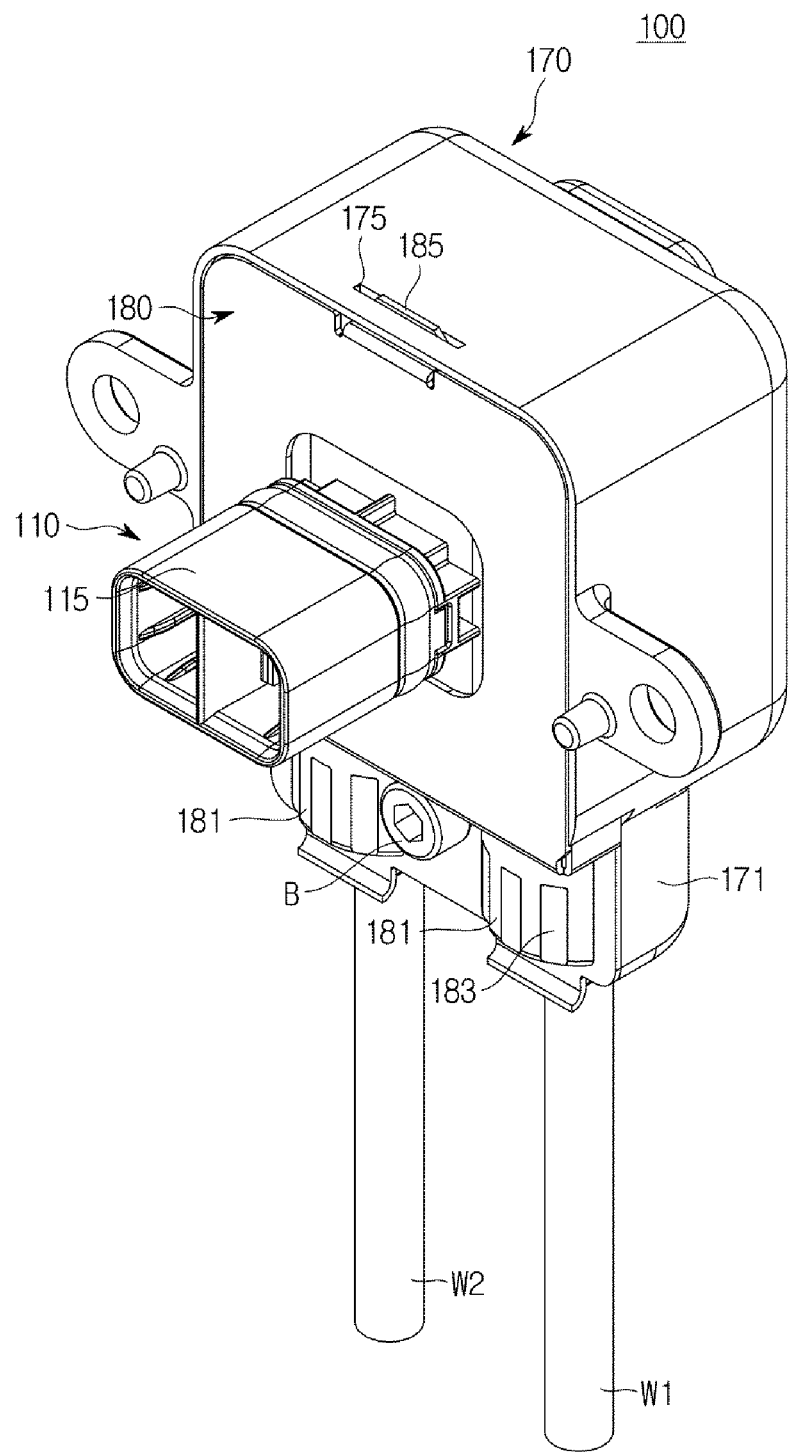
FIG. 1 is a perspective view showing a front portion of a high voltage connector.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Configurations illustrated in the forms and the drawings described in the present specification are only the preferred forms of the present disclosure, and thus it is to be understood that various modified examples, which may replace the forms and the drawings described in the present specification, are possible when filing the present application.

Also, like reference numerals or symbols denoted in the drawings of the present specification represent members or components that perform the substantially same functions.

The terms used in the present specification are used to describe the forms of the present disclosure. Accordingly, it should be apparent to those skilled in the art that the following description of exemplary forms of the present disclosure is provided for illustration purpose only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

In the following description, the terms "front surface", "rear surface", "upper portion", "lower portion", "upper end", and "lower end" are defined based on the drawing shown in FIG. 1, and the shapes and positions of the corresponding components are not limited by the terms.

Hereinafter, the forms of the present disclosure will be described in detail with reference to the accompanying drawings.

Figure 2:
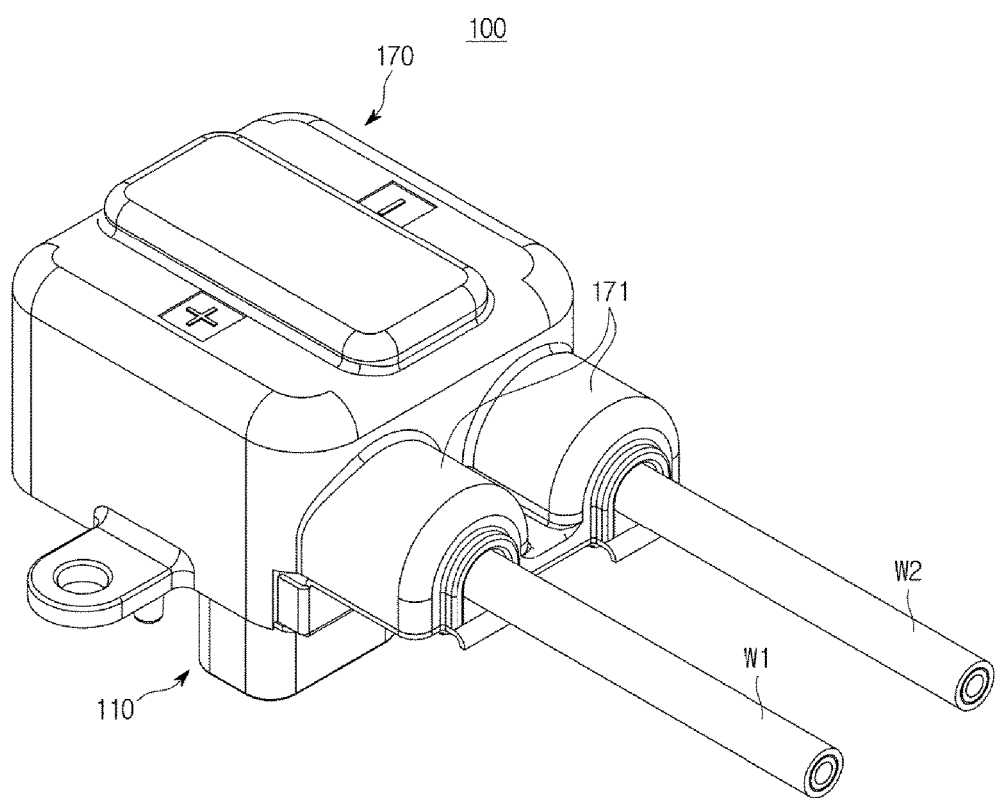
FIG. 2 is a perspective view showing a rear portion of the high voltage connector.
Figure 3:
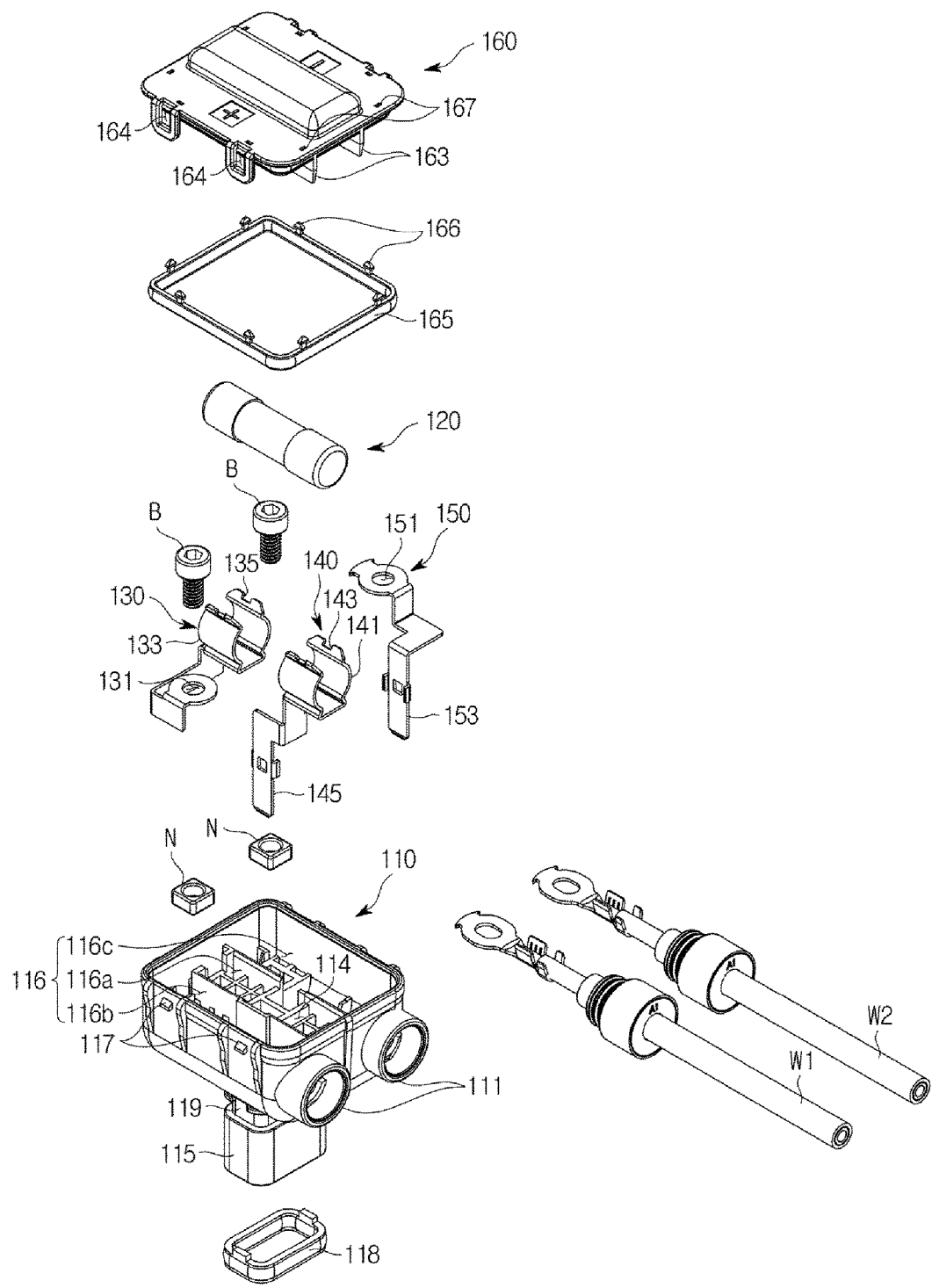
FIG. 3 is an exploded perspective view of a part of the high voltage connector.
Figure 4:
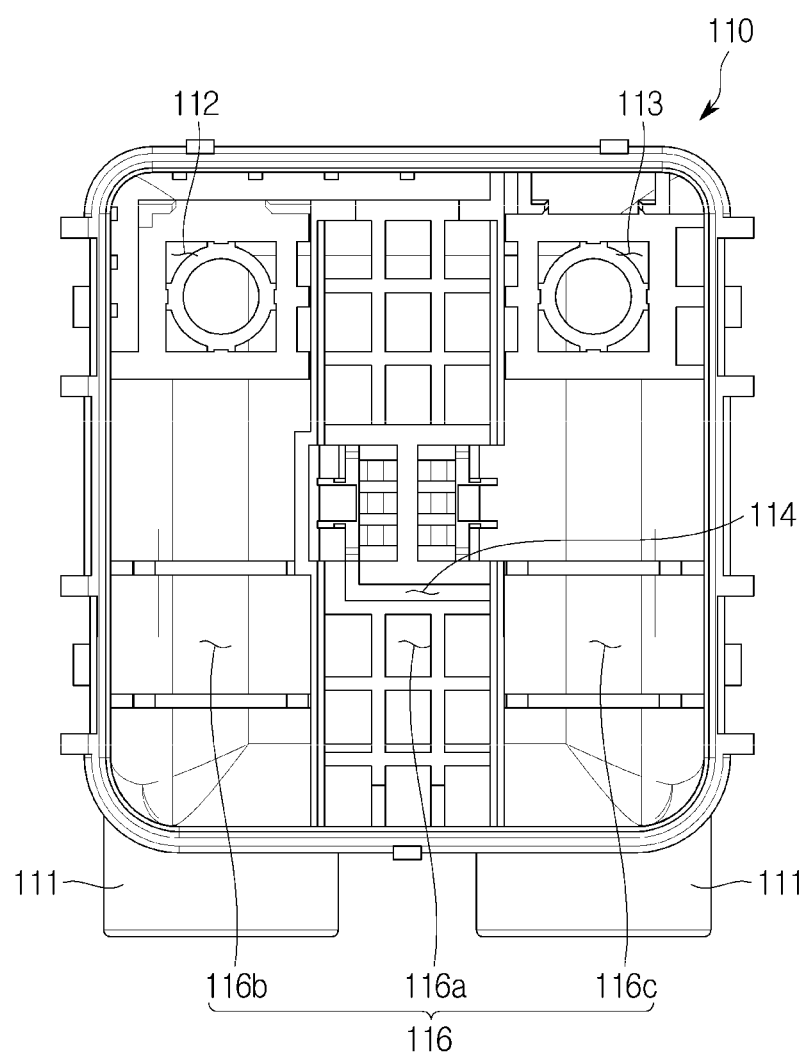
FIG. 4 is a top view showing the inside of a first housing.
Figure 5:
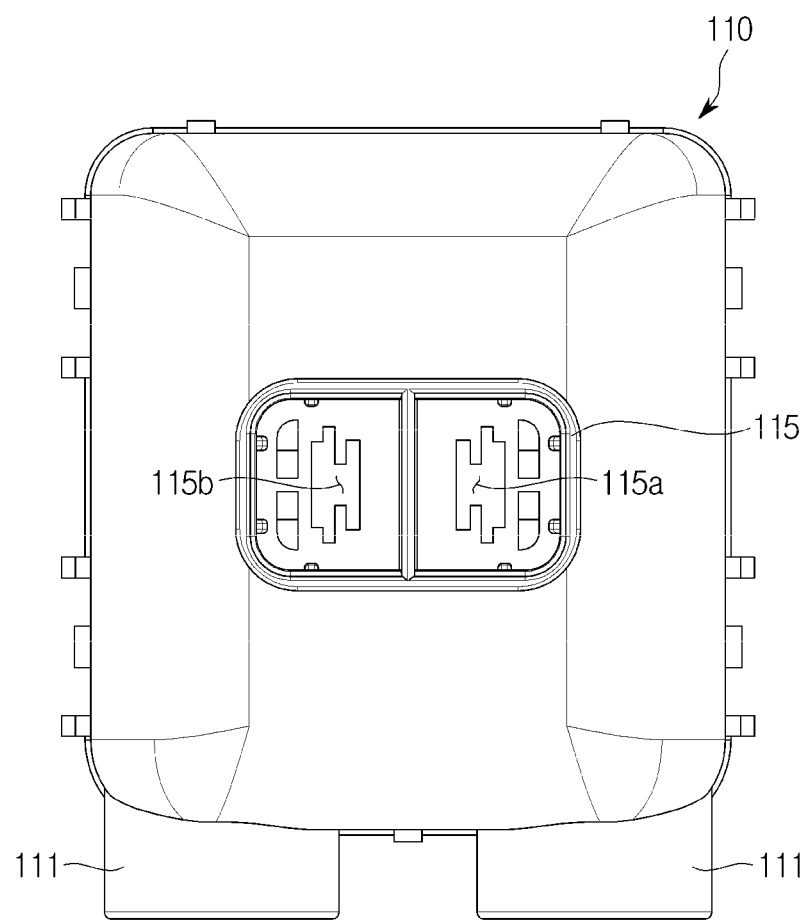
FIG. 5 shows a front portion of the first housing.
Figure 6:
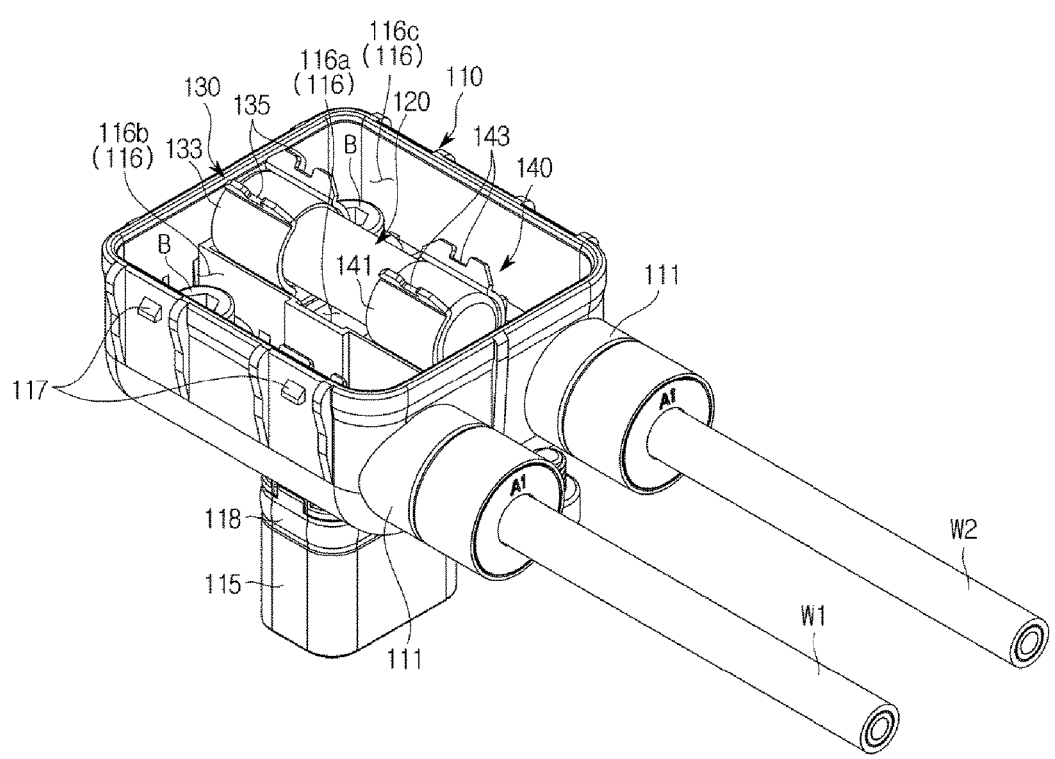
FIG. 6 shows the first housing when a first cover is separated from the first housing.

FIG. 1 is a perspective view showing a front portion of a high voltage connector in some forms of the present disclosure, FIG. 2 is a perspective view showing a rear portion of the high voltage connector in some forms of the present disclosure, FIG. 3 is an exploded perspective view of a part of the high voltage connector in some forms of the present disclosure, FIG. 4 is a top view showing the inside of a first housing in some forms of the present disclosure, FIG. 5 shows a front portion of the first housing in some forms of the present disclosure, and FIG. 6 shows the first housing when a first cover in some forms of the present disclosure is separated from the first housing.

As shown in FIGS. 1 to 6, a high voltage connector 100 may include a first housing 110 forming an accommodating space 116 therein, a fuse 120 accommodated in the first housing 110, a bus bar clip 130 and a bus bar clip terminal 140 accommodated in the first housing 110 and configured to fasten the fuse 120, a male terminal 150 accommodated in the first housing 110, having one end connected to a wire W2 and having a second terminal 153 at the other end, a first cover 160 covering an open rear portion of the first housing 110, a second housing 170 coupled with the rear portion of the first housing 110 to form a rear outer appearance, and a second cover 180 coupled with a front portion of the second housing 170 to form a front outer appearance.

The first housing 110 may open at the rear portion to accommodate the fuse 120, the bus bar clip 130, the bus bar clip terminal 140, and the male terminal 150 through the open rear portion.

The first housing 110 may include a pair of insertion portions 111 in which a first wire W1 and a second wire W2 are respectively inserted, a first nut press-fit portion 112 in which a nut N for fastening the bus bar clip 120 is pressed, a second nut press-fit portion 113 in which a nut N for fastening the male terminal 140 is pressed, a fixing portion 114 in which the bus bar clip terminal 120 is inserted and fastened, and a guide portion 115 through which a first terminal 145 provided in the bus bar clip terminal 130 and a second terminal 153 provided in the male terminal 140 pass to be guided to be connected to a power source.

A first wire connecting hole 131 of the bus bar clip 130 may be formed at a location corresponding to the first nut press-fit portion 112 in which the nut N is pressed, and a bolt B may be coupled with the nut N through the first wire connecting hole 131 so that the bus bar clip 130 can be fastened to inside of the first housing 110 together with the first wire W1.

A second wire connecting hole 151 of the male terminal 140 may be formed at a location corresponding to the second nut press-fit portion 113 in which the nut N is pressed, and a bolt B may be coupled with the nut N through the second wire connecting hole 151 so that the male terminal 150 130 can be fastened to inside of the first housing 110 together with the second wire W2.

The guide portion 115 may extend toward a front direction in the front portion of the first housing 110, and may include a first guide hole 115a through which the first terminal 145 of the bus bar clip terminal 140 fastened to inside of the first housing 110 passes to be connected to the power source, and a second guide hole 115b through which the second terminal 153 of the male terminal 150 fastened to inside of the first housing 110 passes to be connected to the power source.

In the inside of the first housing 110, the accommodating space 116 may be formed, and the accommodating space 116 may be partitioned into a first accommodating space 116a to accommodate the fuse 120, a second accommodating space 116b to accommodate one end of the first wire W1, and a third accommodating space 116c to accommodate one end of the second wire W2 by a plurality of partition walls 163 formed in the first cover 160.

On the edge of the rear portion of the first housing 110, a plurality of fixing hooks 117 may be disposed to fasten the first cover 160, and the first cover 160 may include a plurality of fixing holes 164 to be coupled with the fixing hooks 117.

The guide portion 115 may include a second sealing member 118 and a second sealing member coupling portion 119 in order to improve airtightness of the high voltage connector 100.

The fuse 120 may be accommodated in the first housing 110 and fastened by a first fixing clip 133 of the bus bar clip 130 and a second fixing clip 141 of the bus bar clip terminal 140.

Both ends of the fuse 120 may be detachably fastened to the first fixing clip 133 and the second fixing clip 141, respectively, and accordingly, when the fuse 120 is replaced, the fuse 120 may be easily separated from the first fixing clip 133 and the second fixing clip 141.

The fuse 120 which is primarily fastened at the first fixing clip 133 and the second fixing clip 141 may be secondarily fastened by a first fixing rib 161 and a second fixing rib 162 of the first cover 160 which will be described later to thereby be stably fastened, which will be described later.

The bus bar clip 130 may be accommodated in the first housing 110, and include the first wire connecting hole 131 connected to the first wire W1, and the first fixing clip 133 at which the fuse 120 is detachably fastened.

If the bolt B is coupled with the nut N through the first wire connecting hole 131 after the first wire connecting hole 131 is located to correspond to the first nut press-fit portion 112, the bus bar clip 130 may be fastened to inside of the first housing 110 together with the first wire W1.

Since the first fixing clip 133 for detachably fastening the fuse 120 is integrated into the bus bar clip 130, the fuse 120 can be fastened to inside of the first housing 110 without using a separate component.

The first fixing clip 133 may be in the shape of a ring having an open rear portion such that the fuse 120 can be inserted from a rear direction toward the front direction and fastened.

The first fixing clip 133 may include a first fixing groove 135 formed at both ends, and the first fixing rib 161 of the first cover 160 may be supported on the first fixing groove 135 to prevent the fuse 120 fastened to the first fixing clip 133 from being separated, which will be described later.

The bus bar clip terminal 140 may be accommodated in the first housing 110, and may include the second fixing clip 141 at which the fuse 120 is detachably fastened, and the first terminal 145 connected to the power source.

The bus bar clip terminal 140 may be inserted in the fixing portion 114 provided in the inside of the first housing 110 to be fastened to inside of the first housing 110.

Since the second fixing clip 141 for detachably fastening the fuse 120 is integrated into the bus bar clip terminal 140, the fuse 120 may be fastened to inside of the first housing 110 without using a separate component.

The second fixing clip 141 may be in the shape of a ring having an open rear portion such that the fuse 120 can be inserted from the rear direction toward the front direction and fastened.

The second fixing clip 141 may include a second fixing groove 143 formed at both ends, and the second fixing rib 162 of the first cover 160 may be supported on the second fixing groove 143 so as to prevent the fuse 120 fastened to the second fixing clip 141 from being separated, which will be described later.

The first terminal 145 connected to the power source may be integrated into the bus bar clip terminal 140 so that the bus bar clip terminal 140 can be connected directly to the power source.

The male terminal 150 may be accommodated in the inside of the first housing 110, and include the second wire connecting hole 151 connected to the second wire W2, and the second terminal 153 connected to the power source.

If the bolt B is coupled with the nut N through the second wire connecting hole 151 after the second wire connecting hole 151 is located to correspond to the second nut press-fit portion 113, the male terminal 150 may be fastened to inside of the first housing 110 together with the second wire W2.

Figure 7:
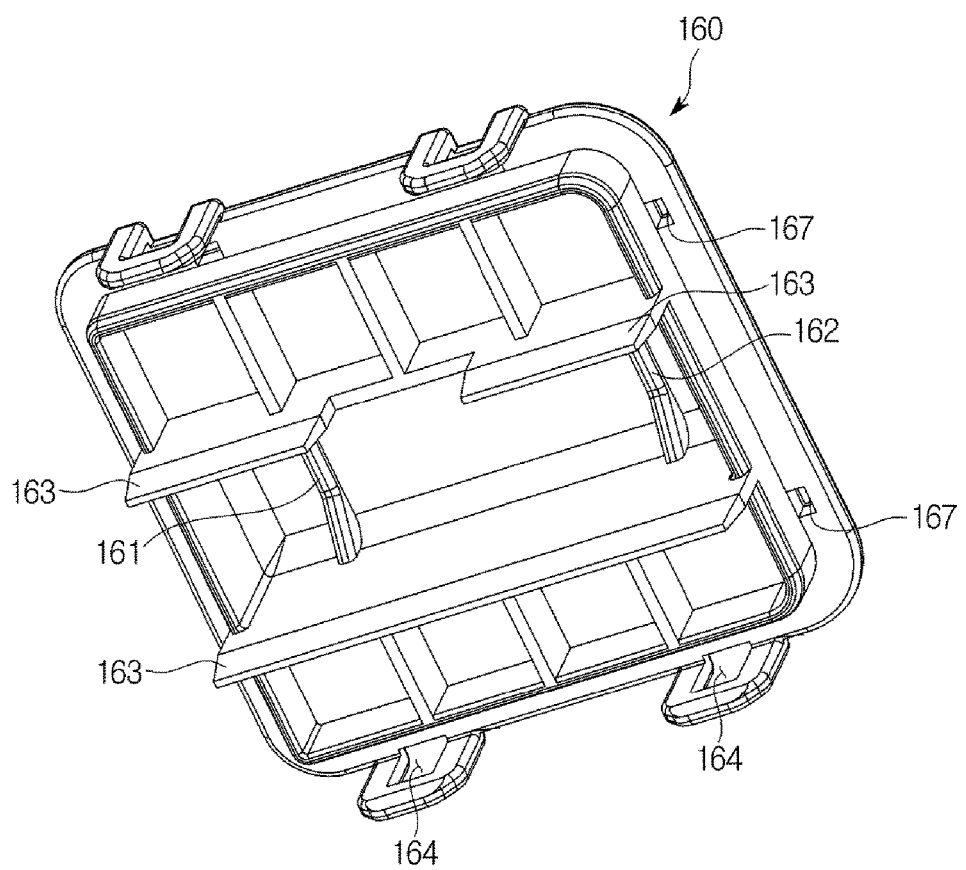
FIG. 7 shows a bottom of the first cover.
Figure 8:
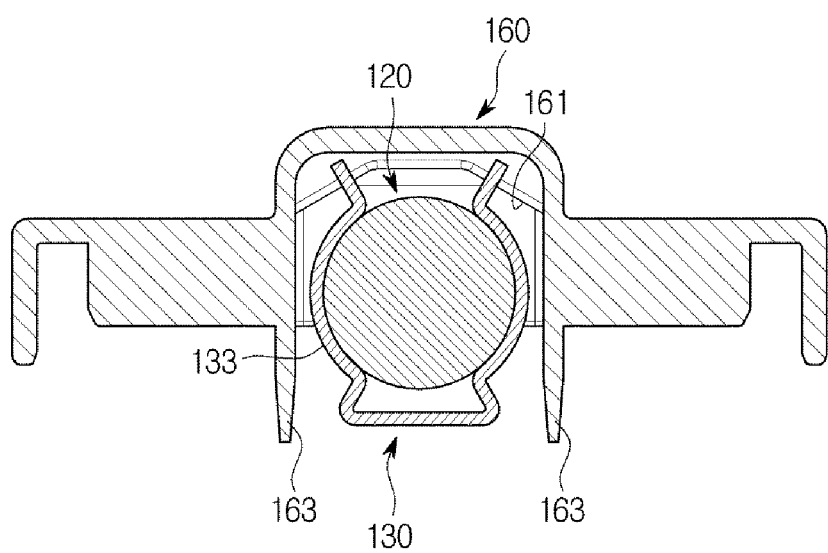
FIG. 8 is a cross-sectional view showing a state in which a fuse is fastened by a fixing clip and a fixing rib.

FIG. 7 shows a bottom of the first cover in some forms of the present disclosure, and FIG. 8 is a cross-sectional view showing a state in which a fuse is fastened by a fixing clip and a fixing rib.

As shown in FIGS. 7 and 8, the first cover 160 may include the first fixing rib 161 supporting the first fixing groove 135 formed in the first fixing clip 133 of the bus bar clip 130 to fasten the fuse 120 fastened to the first fixing clip 133 to prevent the fuse 120 from being separated, and the second fixing rib 162 supporting the second fixing groove 143 formed in the second fixing clip 141 of the bus bar clip terminal 140 to fasten the fuse 120 fastened to the second fixing clip 141 to prevent the fuse 120 from being separated (see FIG. 3).

The first fixing rib 161 and the second fixing rib 162 may be formed at locations at which they can support the first fixing groove 135 and the second fixing groove 143, respectively, when the first cover 160 is fastened to the first housing 110.

If the first cover 160 is fastened to the first housing 110, the first fixing rib 161 and the second fixing rib 162 may support the first fixing groove 135 and the second fixing groove 143, respectively, to prevent the fuse 120 whose both ends are fastened to the first fixing clip 133 and the second fixing clip 143 from being separated.

Since the fuse 120 is primarily fastened by the first fixing clip 133 and the second fixing clip 141 and secondarily fastened by the first fixing rib 161 and the second fixing rib 162 supporting the first fixing groove 135 and the second fixing groove 143, the fuse 120 can be stably fastened.

Also, the first cover 160 may further include the plurality of partition walls 163 to partition the inside of the first housing 110 into a plurality of accommodating spaces 116, and a plurality of fixing holes 164 which the plurality of fixing hooks 117 formed in the first housing 110 are inserted into and fastened to (see FIG. 3).

The inside of the first housing 110 may be partitioned into the first accommodating space 116a to accommodate the fuse 120, the second accommodating space 116b to accommodate one end of the first wire W1, and the third accommodating space 116c to accommodate one end of the second wire W2, by the plurality of partition walls 163 (see FIG. 6).

Since the space in which the fuse 120, the first wire W1, and the second wire W2 are accommodated is partitioned by the plurality of partition walls 163, insulating distances may increase, which may lead to a reduction in size of the high voltage connector 100.

Also, the first cover 160 may further include a first sealing member 165 to seal between the first cover 190 and the first housing 110, thereby improving airtightness (see FIG. 3).

The first sealing member 165 may include a plurality of assembling hooks 166 formed along the edge. The plurality of assembling hooks 166 may be inserted into a plurality of assembling holes 167 formed in the first cover 160 to be assembled.

Since the first sealing member 165 is assembled on the front portion of the first cover 160, the first sealing member 165 may seal between the first cover 160 and the first housing 110.

Figure 9:
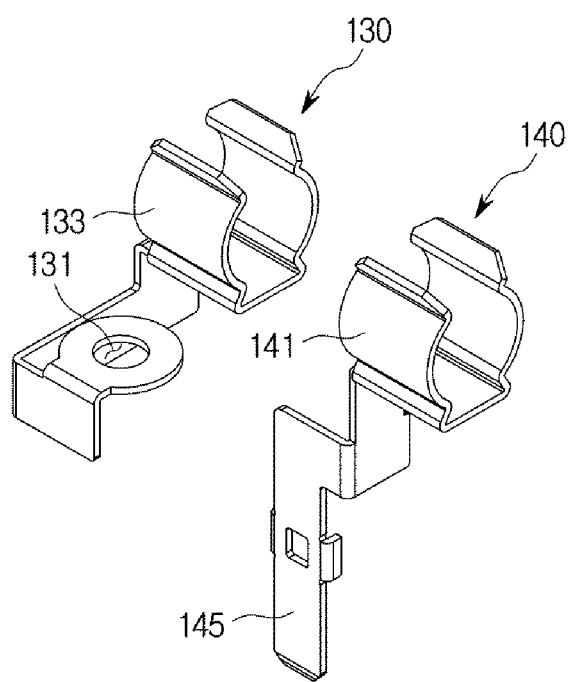
FIG. 9 shows a bus bar clip and a bus bar clip terminal.
Figure 10:
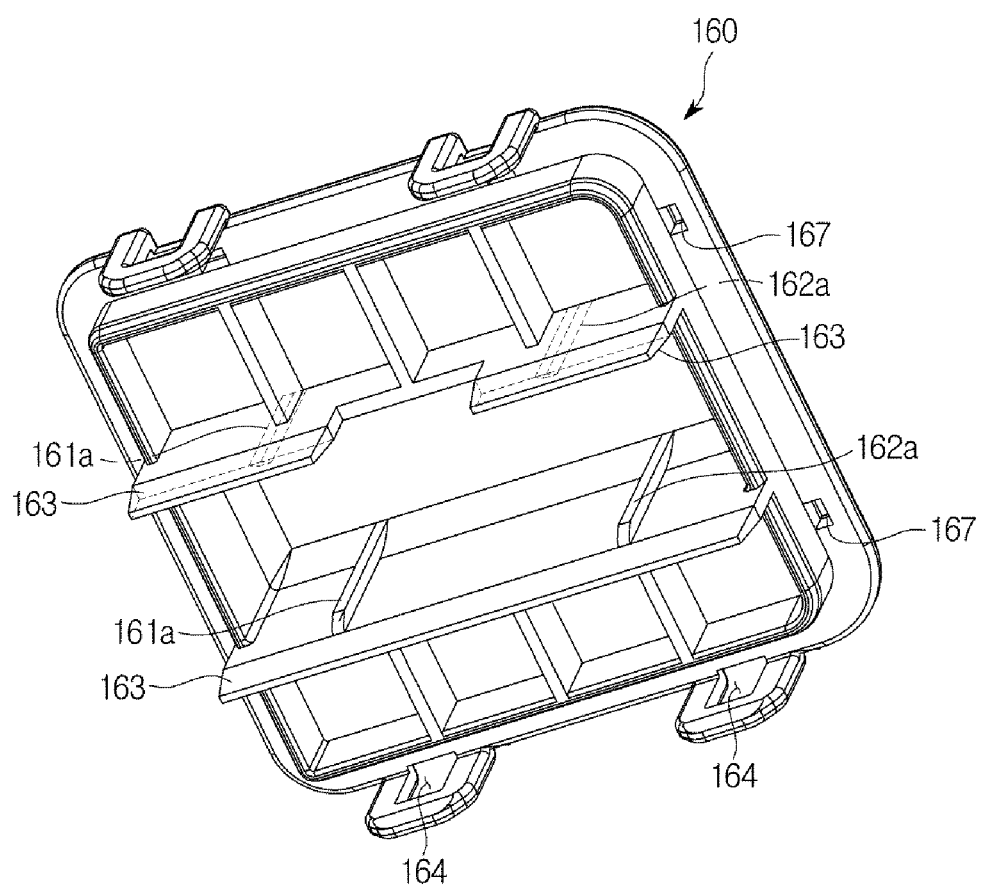
FIG. 10 shows a bottom of a first cover.
Figure 11:
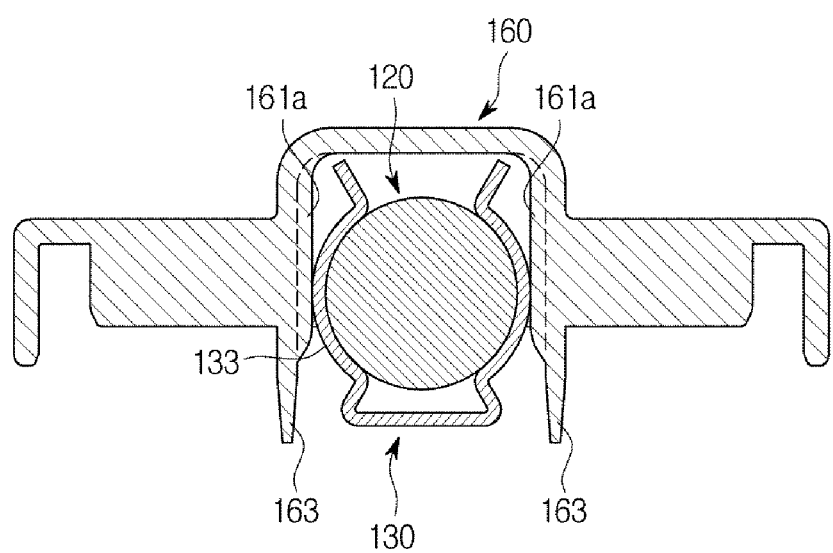
FIG. 11 is a cross-sectional view showing a state in which a fuse is fastened by a fixing clip and a fixing rib.

FIG. 9 shows a bus bar clip and a bus bar clip terminal in some forms of the present disclosure, FIG. 10 shows a bottom of a first cover in other forms of the present disclosure, and FIG. 11 is a cross-sectional view showing a state in which a fuse in other forms of the present disclosure is fastened by a fixing clip and a fixing rib.

As shown in FIGS. 9 to 11, no fixing groove may be formed in the first fixing clip 133 formed in the bus bar clip 130, and the second fixing clip 141 formed in the bus bar clip terminal 140.

In the case in which no fixing groove is formed in the first fixing clip 133 and the second fixing clip 141, a pair of first fixing ribs 161a and a pair of second fixing ribs 162a may be respectively formed on both surfaces of the partition walls 163.

If the pair of first fixing ribs 161a and the pair of second fixing ribs 162a are respectively formed on both surfaces of the partition walls 163, the pair of fixing ribs 161a may press the first fixing clip 133 at both ends to fasten the fuse 120, and the pair of fixing ribs 162a may press the second fixing clip 141 at both ends to fasten the fuse 120.

Figure 12:
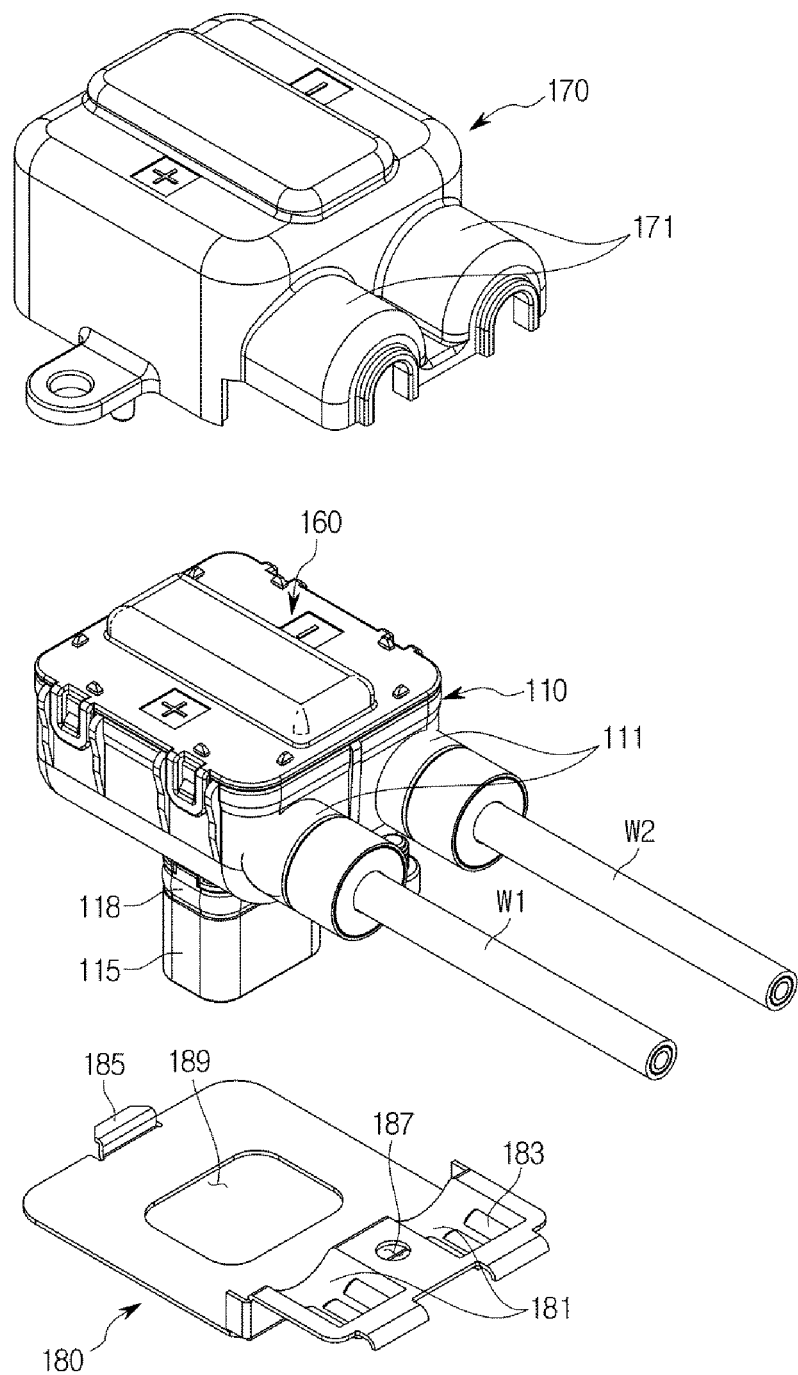
FIG. 12 shows a state in which a second cover is separated from a second housing in the high voltage connector.
Figure 13:
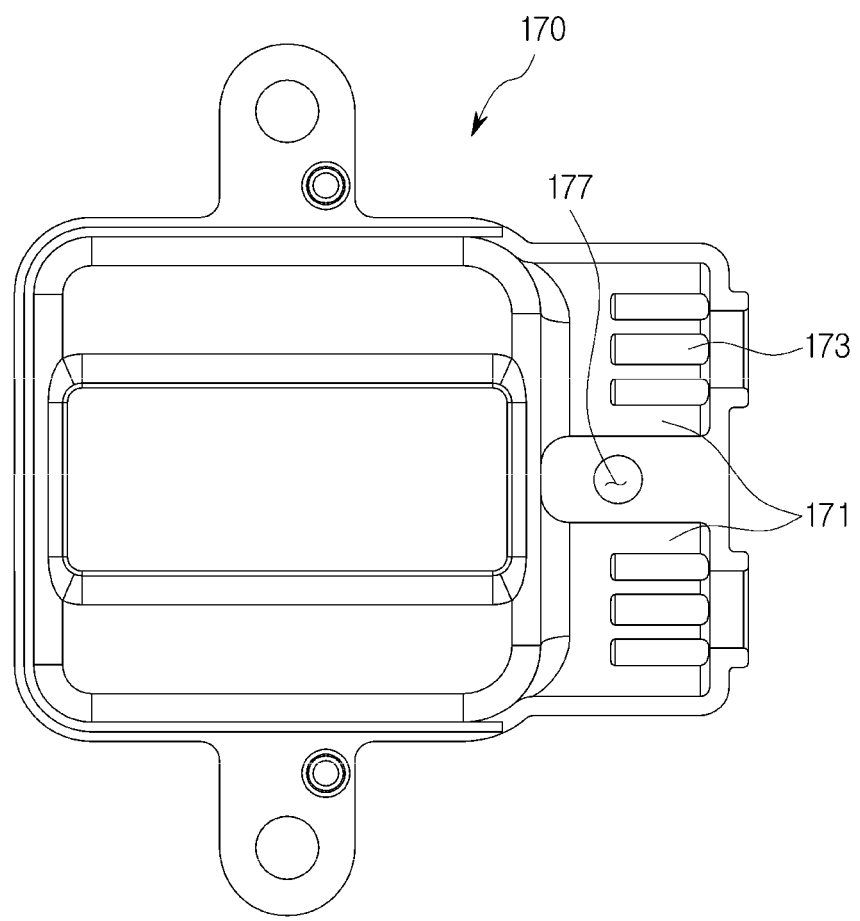
FIG. 13 shows a front portion of a second housing.
Figure 14:
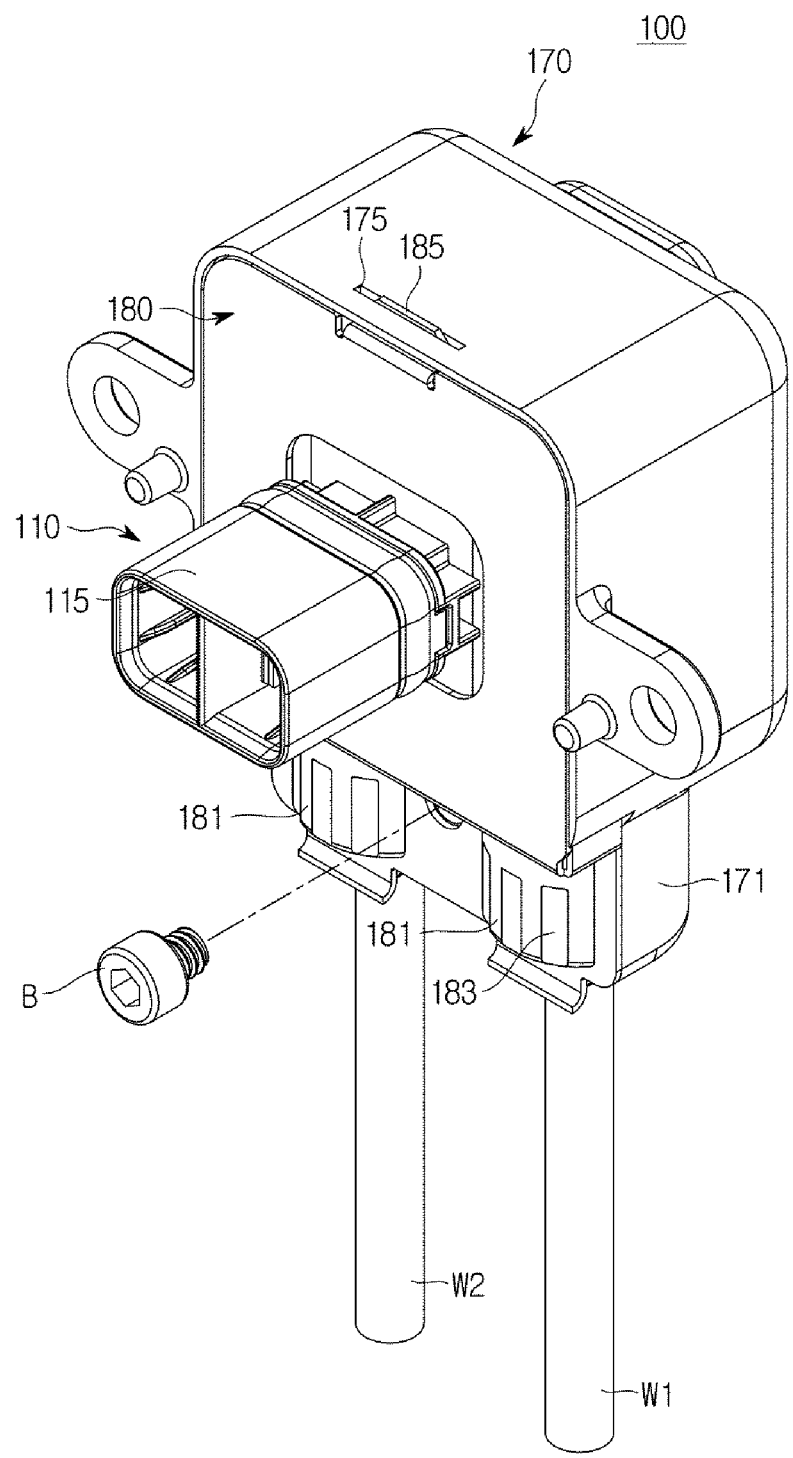
FIG. 14 shows a state in which a second cover is coupled with the second housing by a bolt.

FIG. 12 shows a state in which a second cover is separated from a second housing in the high voltage connector in some forms of the present disclosure, FIG. 13 shows a front portion of a second housing in some forms of the present disclosure, and FIG. 14 shows a state in which a second cover is coupled with the second housing in some forms of the present disclosure by a bolt.

As shown in FIGS. 12 and 13, the second housing 170 may be coupled with the rear portion of the first housing 110 to form the rear outer appearance of the high voltage connector 100, and the second cover 180 may be coupled with the front portion of the second housing 170 to form the front outer appearance of the high voltage connector 100.

The second cover 180 and the second housing 170 surrounding the first housing 110 may be made of an electro-conductive material in order to block electromagnetic waves generated from the inside of the first housing 110.

The second housing 170 and the second cover 180 may include a pair of shielding portions 171 and 181 respectively surrounding front and rear portions of outer circumference surfaces of the pair of insertion portions 111 provided in the first housing 110.

The shielding portions 171 and 181 may include a plurality of beads 173 and 183 protruding toward the first wire W1 and the second wire W2 from the inner circumference surfaces of the shielding portions 171 and 181 in order to shield the first wire W1 and the second wire W2 to thus block electromagnetic waves generated from the inside of the first housing 1.

The second cover 180 may include a coupling hook 185 for coupling with the second housing 170, and a first coupling hole 187. The second housing 170 may include a coupling portion 175 with which the coupling hook 185 is coupled, and a second coupling hole 177 formed at a location corresponding to the first coupling hole 187 (see FIG. 1).

The second cover 180 may further include an opening 189 through which the guide portion 115 of the first housing 110 passes.

By inserting the coupling hook 185 of the second cover 180 into the coupling portion 175 of the second housing 170 to couple the second cover 180 with the second housing 170, and then inserting a bolt B through the first coupling hole 187 and the second coupling hole 177, the second cover 180 may be coupled with the second housing 170.

At this time, as shown in FIG. 14, the bolt B inserted into the first coupling hole 187 and the second coupling hole 177 may be coupled with the front portion of the high voltage connector 100 through the first coupling hole 187 located in a direction in which the first terminal 145 and the second terminal 153 are connected to the power source.

Since the bolt B is coupled with the front portion of the high voltage connector 100 through the first coupling hole 187 located in the direction in which the first terminal 145 and the second terminal 153 are connected to the power source, the bolt B will be able to be removed after the high voltage connector 100 is separated from the power source, in order to replace the fuse 120.

Accordingly, safety accidents that may occur when replacing the fuse 120 may be prevented.

Figure 15:
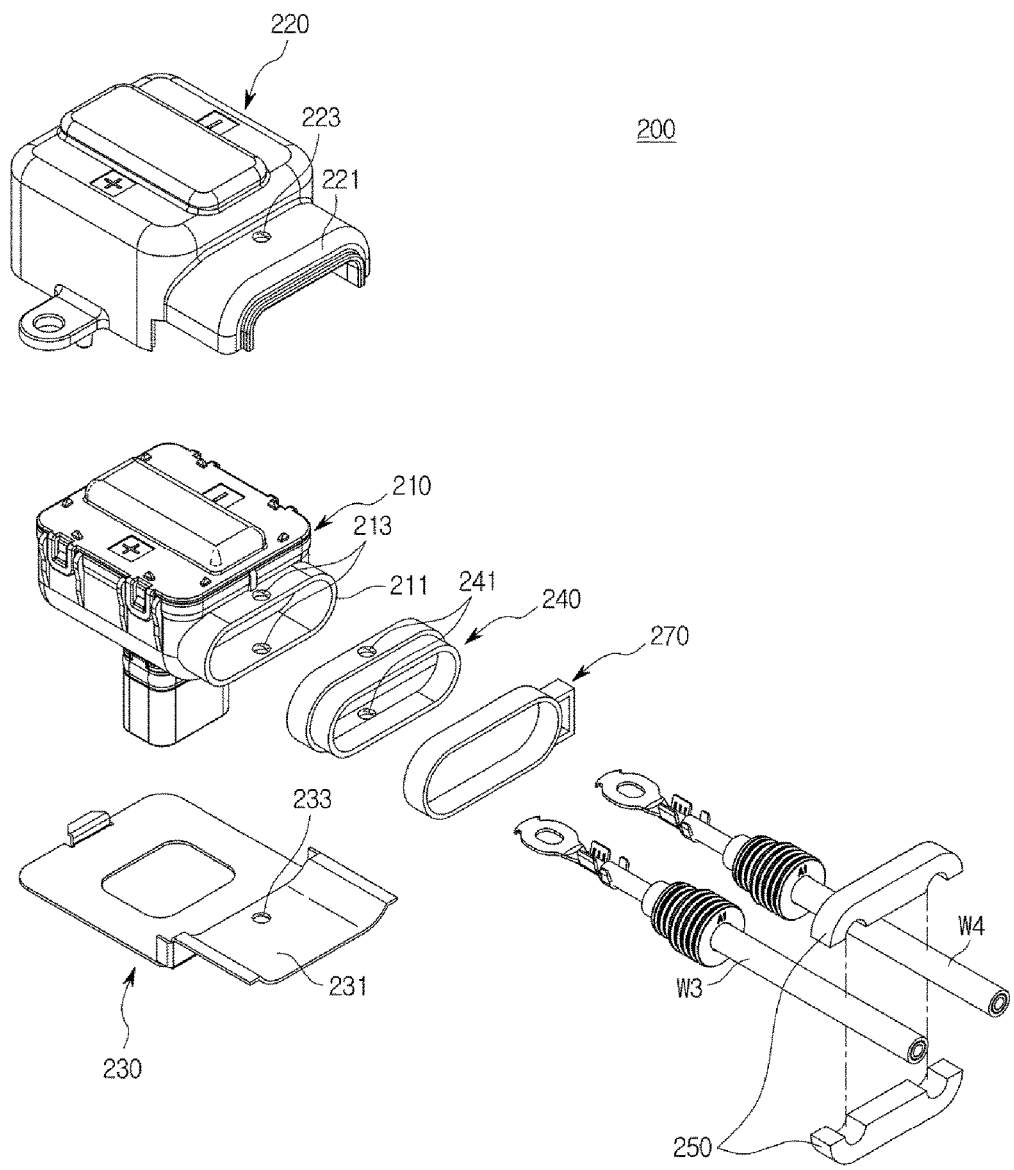
FIG. 15 is an exploded perspective view of a high voltage connector.
Figure 16:
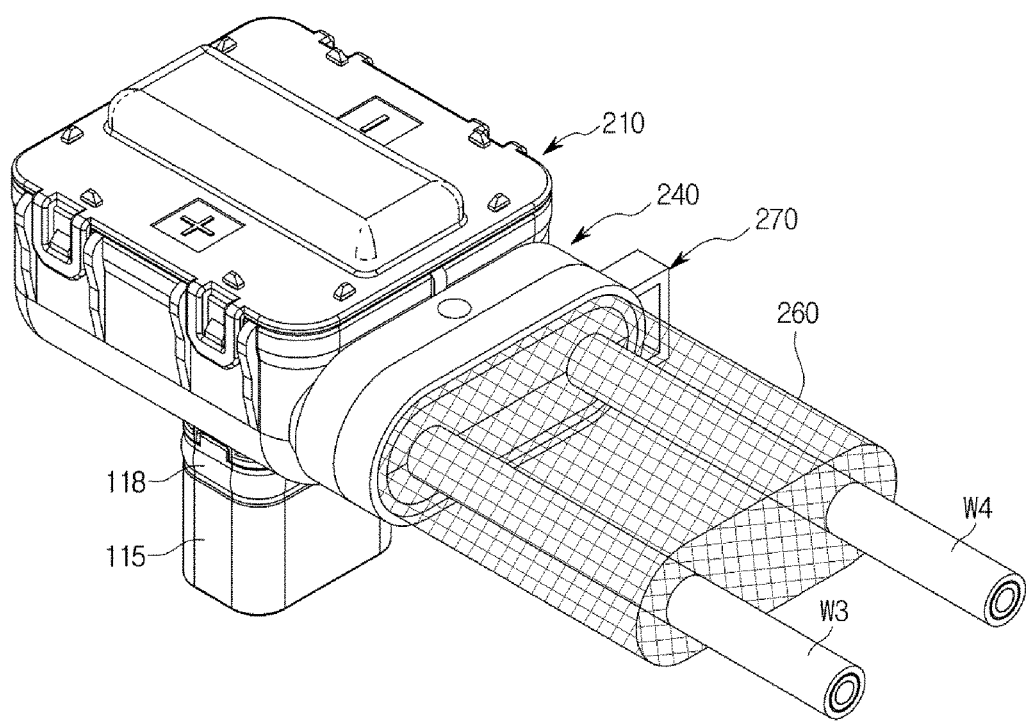
FIG. 16 shows a high voltage connector.

FIG. 15 is an exploded perspective view of a high voltage connector in other forms of the present disclosure, and FIG. 16 shows a high voltage connector in other forms of the present disclosure.

The high voltage connector 100 shown in FIGS. 1 to 14 may use an independent shielding method in which shielding wires are installed in the insides of the first wire W1 and the second wire W2.

As shown in FIGS. 15 and 16, in the case of surrounding a first wire W3 and a second wire W4 with separate shielding wires 260, a high voltage connector 200 may have a configuration that is partially different from that of the high voltage connector 100 shown in FIGS. 1 to 14, in order to fasten the shielding wires 260.

Hereinafter, components of the high voltage connector 200, which are different from those of the high voltage connector 100 shown in FIGS. 1 to 14, will be described, and descriptions about the same components of the high voltage connector 200 as those of the high voltage connector 100 will be omitted.

As shown in FIGS. 15 and 16, a first housing 210 may include an insertion portion 211 in which the first wire W3 and the second wire W4 are inserted, and a second through hole 213 through which a bolt B for coupling a second housing 220 with a second cover 230 passes.

The second housing 220 may include a first extension portion 221 surrounding a rear part of the insertion portion 211, and a second coupling hole 223 formed in the first extension portion 221 to couple the second housing 220 with the second cover 230 through the bolt B.

The second cover 230 may include a second extension portion 231 surrounding a front part of the insertion portion 211, and a second coupling hole 233 formed in the second extension portion 231 to couple the second cover 230 with the second housing 220 through the bolt B.

The first wire W3 and the second wire W4 may be fastened by a holder 250, and the holder 250 may be coupled with an end of the insertion portion 211.

A shield cover 240 for fastening the shielding wires 260 may be coupled with an outer circumference surface of the insertion portion 211, and the shielding wires 260 may be fastened on the shield cover 240 by a clamp 270 to surround the first wire W3 and the second wire W4.

In order to couple the second housing 220 with the second cover 230 by the bolt B, the shield cover 240 coupled with the insertion portion 211 may include a first through hole 241 formed at a location corresponding to the second through hole 213 formed in the insertion portion 211.

Accordingly, the bolt B may be inserted through the first coupling hole 233, and the bolt B inserted in the first coupling hole 233 may be coupled with the second coupling hole 223 through the first through hole 241 and the second through hole 213, so as to couple the second housing 220 with the second cover 230.

In some forms of the present disclosure, since the fuse can be fastened without using a separate component, the fuse can be easily replaced.

Also, the assembly process of the fuse can be improved, thereby increasing product productivity.

Also, the number of components can be reduced, resulting in miniaturization of the high voltage connector.

Also, since the fuse and the wires are provided in separate partitioned spaces, insulating distances can increase, resulting in miniaturization of the high voltage connector.

Also, since the fuse is stably fastened, a fire that may break outs due to a short may be reduced.

Since it is difficult to replace the fuse without separating the high voltage connector from a power source, the number of accidents can be reduced as well.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A high voltage connector comprising:
   a first housing having an open rear portion;
   a fuse provided inside the first housing;
   a bus bar clip provided inside the first housing, the bus bar clip comprising:
      a first wire connecting hole connected to a first wire; and
      a first fixing clip configured to detachably fasten the fuse;
   a bus bar clip terminal provided inside the first housing, the bus bar clip terminal comprising:
      a second fixing clip configured to detachably fasten the fuse and to form a clip shape; and
      a first terminal connected to a power source; and
   a male terminal provided inside the first housing, the male terminal comprising:
      a second wire connecting hole connected to a second wire; and
      a second terminal connected to the power source.

2. The high voltage connector of claim 1, wherein the high voltage connector further comprises:
   a first cover configured to cover the open rear portion of the first housing;
   a second housing coupled with the rear portion of the first housing, wherein the second housing is configured to form an outer appearance and to block electromagnetic waves generated from an inside of the first housing; and
   a second cover coupled with a front portion of the second housing, wherein the second cover is configured to form an outer appearance and to block electromagnetic waves generated from the inside of the first housing.

3. The high voltage connector of claim 2, wherein a first sealing member is configured to seal the inside of the first housing and is coupled with a front portion of the first cover.

4. The high voltage connector of claim 2, wherein the first housing comprises:
   a pair of insertion portions configured to insert the first wire and the second wire into the insertion portions;
   a first nut press-fit portion configured to press a first nut such that the first nut fastens the bus bar clip;
   a second nut press-fit portion configured to press a second nut such that the second nut fastens the male terminal;
   a fixing portion configured to insert the bus bar clip terminal into the fixing portion; and
   a guide portion connected to the power source, wherein the first terminal and the second terminal pass through the guide portion.

5. The high voltage connector of claim 4, wherein the bus bar clip is provided inside the first housing such that:
   the first wire connecting hole is provided at a location corresponding to the first nut press-fit portion; and
   the bus bar clip is fastened inside the first housing together with the first wire by a bolt, wherein the bolt is coupled with the first nut through the first wire connecting hole.

6. The high voltage connector of claim 4, wherein the male terminal is provided inside the first housing such that:
   the second wire connecting hole is provided at a location corresponding to the second nut press-fit portion; and
   the male terminal is fastened inside the first housing together with the second wire by a bolt, wherein the bolt is coupled with the second nut through the second wire connecting hole.

7. The high voltage connector of claim 1, wherein the first fixing clip and the second fixing clip are configured to:
   form a ring shape having an open portion; and
   insert the fuse into the first fixing clip and the second fixing clip.

8. The high voltage connector of claim 7, wherein the first fixing clip comprises a first fixing groove provided at both ends of the first fixing clip, and wherein the second fixing clip comprises a second fixing groove provided at both ends of the second fixing clip.

9. The high voltage connector of claim 8, wherein the first cover comprises:
   a first fixing rib and a second fixing rib, wherein the first fixing rib and the second fixing rib are configured to:
      support the first fixing groove and the second fixing groove; and
      prevent the fuse from being separated through the open portion, wherein the fuse is fastened to the first fixing clip and the second fixing clip.

10. The high voltage connector of claim 7, wherein the first cover comprises:
    a pair of first fixing ribs configured to press the first fixing clip at both ends of the first fixing clip and to fasten the fuse; and
    a pair of second fixing ribs configured to press the second fixing clip at both ends of the second fixing clip and to fasten the fuse.

11. The high voltage connector of claim 2, wherein the first cover further comprises:
    a first accommodating space configured to accommodate the fuse inside the first housing;
    a second accommodating space configured to accommodate one end of the first wire; and
    a third accommodating space configured to accommodate one end of the second wire.

12. The high voltage connector of claim 2, wherein the second housing and the second cover are configured to block electromagnetic waves generated from the inside of the first housing and are made of an electro-conductive material.

13. The high voltage connector of claim 4, wherein the second housing and the second cover comprise:
    a pair of shielding portions configured to cover outer surfaces of the pair of the insertion portions.

14. The high voltage connector of claim 13, wherein the pair of the shielding portions comprise:
    a plurality of beads protruding toward the first wire and the second wire from the inner surfaces of the shielding portions, wherein the plurality of the beads are configured to shield the first wire and the second wire such that the first wire and the second wire block electromagnetic waves generated from the inside of the first housing.

15. The high voltage connector of claim 2, wherein the second cover comprises:
    a coupling hook coupled with the second housing; and
    a first coupling hole coupled with the second housing by a bolt,
    wherein the second housing comprises:

a coupling portion configured to insert the coupling hook into the coupling portion; and a second coupling hole formed at a location corresponding to the first coupling hole.

16. The high voltage connector of claim 15, wherein the second cover is coupled with the second housing by a bolt that is inserted into the first coupling hole and the second coupling hole;

wherein the bolt is inserted into the second coupling hole through the first coupling hole; and wherein the first coupling hole is located in a direction that the first terminal and the second terminal are connected to the power source.

\* \* \* \* \*